United States Patent [19]

Arimatsu et al.

[11] Patent Number: 4,824,929
[45] Date of Patent: Apr. 25, 1989

[54] POLYMERIC ANTIOXIDANT AND PROCESS FOR PRODUCTION THEREOF

[75] Inventors: Yoshikazu Arimatsu, Otsu; Katsuya Tani, Shiga; Hideyuki Mitamura, Otsu; Minoru Saito, Otsu; Atsushi Kaji, Otsu; Kenichi Katsuo, Tsuruga, all of Japan

[73] Assignee: Toyo Boseki Kabushiki Kaisha, Osaka, Japan

[21] Appl. No.: 93,605

[22] Filed: Sep. 8, 1987

Related U.S. Application Data

[63] Continuation-in-part of Ser. No. 842,966, Mar. 24, 1986, abandoned.

[30] Foreign Application Priority Data

Mar. 26, 1985 [JP] Japan .............................. 60-62899
Jun. 24, 1985 [JP] Japan ............................. 60-138495

[51] Int. Cl.$^4$ .............................................. C08G 61/02
[52] U.S. Cl. ..................................... 528/205; 528/212; 528/214; 528/217
[58] Field of Search ................. 528/205, 212, 214, 217

[56] References Cited

U.S. PATENT DOCUMENTS 3,004,953 10/1961 Sonnabend ........................... 528/205
3,546,173 12/1970 Hunt ...................................... 528/205
3,553,290 1/1972 Hunt ...................................... 528/205
3,996,199 12/1976 Weinshenker et al. ............. 528/205

Primary Examiner—Harold D. Anderson

[57] ABSTRACT

A polymeric antioxidant which comprises a monomeric unit having a formula (I):

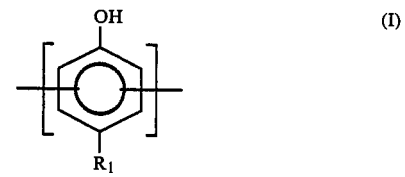

wherein $R_1$ is methyl or ethyl; and a monomeric unit having a formula (II):

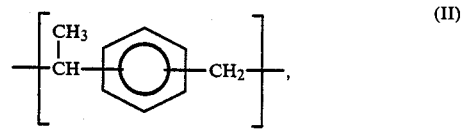

which imparts an excellent resistance against heat- or light-aging to a synthetic fiber and a resin.

11 Claims, 1 Drawing Sheet

POLYMERIC ANTIOXIDANT AND PROCESS FOR PRODUCTION THEREOF

This application is a continuation-in-part application of application Ser. No. 842,966 filed Mar. 24, 1986, now abandoned.

FIELD OF THE INVENTION

The present invention relates to a polymeric antioxidant imparting resistance against light- and heat-aging to a synthetic fiber and a resin, and also relates to a process for production of said antioxidant.

BACKGROUND OF THE INVENTION

A synthetic fiber or a resin composed of polyurethane, polyether, polyester, polyamide, polyethylene, polypropylene, polystyrene, polyacetal or the like, which comprises a polymer alone, is known to suffer oxidative degradation, such as aging, changing in color or loss in desirable mechanical properties by heat during the processing step or light during their service.

In order to solve the above problems, the following methods are proposed.

(1) It has been well known that various kinds of phenol-type antioxidants are added to a synthetic fiber or a synthetic resin during the production or processing process. For example, 2,6-di-t-butyl-4-methylphenol, 4,4'-butylidenebis(3-methyl-6-t-butylphenol), tetrakis[methylene-3-(3', 5'- di-t-butyl-4'-hydroxyphenyl)propionate]methane,1,3,5-trimethyl- 2,4,6-tris(3,5-di-t-butyl-4-hydroxybenzyl)benzene, tris(3,5-di-t-butyl-4-hydroxybenzyl)isocyanurate, tris(2,6-dimethyl-4-t-butyl-3-hydroxybenzyl)isocyanurate and the like can be used.

(2) Further, it has been recently proposed to use an antioxidant having high-molecular weight. For example, a polyurethane elastic fiber containing a polyaddition compound of p-cresol and divinylbenzene (Japanese Patent Publication No. 6510/1972), a phenol acrylate ester polymer (Japanese Patent Publication No. 34667/1974), an isopropenyl phenol olygomer (Japanese Patent Laid Open Publication No. 20247/1976), an antioxidant containing o-substituted phenol novolak as a main ingredient (Japanese Laid Open Publication No. 71912/1983).

According to the above conventional method (1), however, an antioxidant is scattered during a processing step, or a product is discolored during its service life. Especially, it has insufficient properties to be used for a synthetic fiber.

As for the above conventional method (2), it is effective, to some extent, to prevent scattering of an antioxidant or to improve its resistance upon usage such as its dry-cleaning resistance in a fabric in comparison with usage of an antioxidant having low-molecular weight. This method, however, inadvantageously involves complicated processes in purification of a starting material or producing. Further, such antioxidant itself is remarkably colored, therefore its applications are restricted.

In order to solve the above mentioned problems, the present inventors have intensively studied. As the result, there has been found a polymeric antioxidant with excellent properties and the production thereof, which can be obtained by using a commercially available starting material without any purification.

OBJECT OF THE INVENTION

It is an object of the present invention to provide a polymeric antioxidant which imparts an excellent resistance against heat- or light-aging to a synthetic fiber and a resin, and is hardly colored, and can be obtained without a complicated process in production thereof or purification of its starting material.

It is another object of the present invention to provide a process for production of a polymeric antioxidant with excellent properties.

SUMMARY OF THE INVENTION

According to the present invention, there is provided a polymeric antioxidant which comprises a monomeric unit having a formula (I):

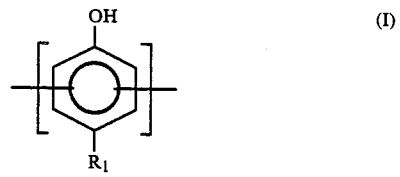

wherein $R_1$ is methyl or ethyl; and a monomeric unit having a formula (II):

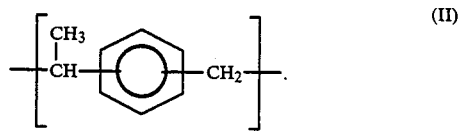

The polymeric antioxidant of the present invention preferably has a number average molecular weight of 1,000–8,000. In the polymeric antioxidant, the monomers may be in a head-to-head, or head-to-tail arrangement.

According to the present invention, there is also provided a process for production of a polymeric antioxidant which comprises reacting of p-alkyl phenol monomer having a formula (III):

wherein $R_1$ is methyl or ethyl; with a monomer having a formula (IV):

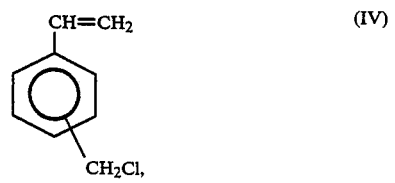

in substantially inert solvent in the presence of Friedel-Crafts catalyst.

DETAILED DESCRIPTION OF THE INVENTION

Figure 1:
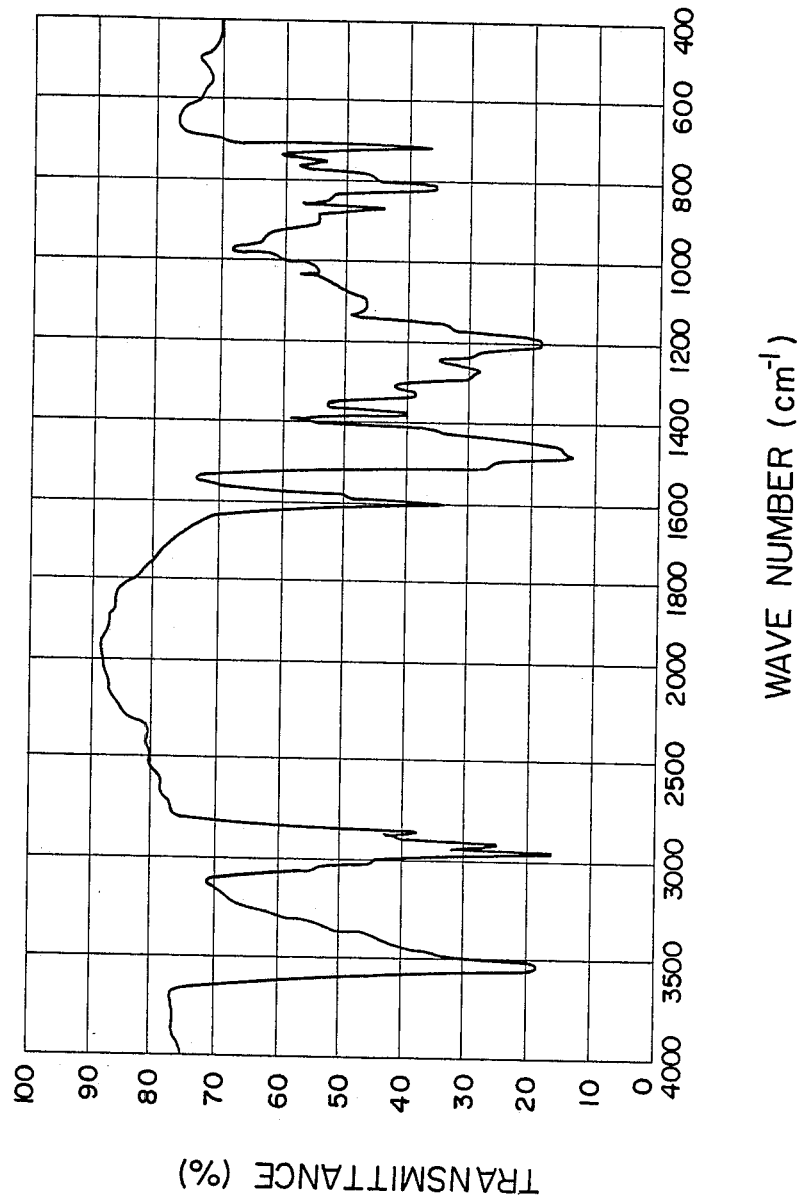
FIG. 1 shows a IR spectrum of the antioxidant obtained in Example 1.

The production of the polymeric antioxidant of the present invention is carried out by reacting (a) p-cresol or p-ethyl phenol (hereinafter referred as "p-alkyl phenol") and (b) p- and/or m-chloromethylstyrene in a substantially inert solvent in the presence of Friedel-Crafts catalyst.

It is known that p- and/or m-chloromethylstyrene (b) used in the present invention can be produced by the reaction of corresponding vinyltoluene or ethyltoluene with chlorine in the same manner as described in U.S. Pat. No. 2,981,758 and Japanese Patent Publication No. 103528/1973, the disclosures of which are incorporated herein by reference. Commercially available products such as CMS® (produced by Seimi Chemical KK, Shizuoka-ken, Japan) can be employed.

Examples of Friedel-Crafts catalysts of the present invention including those described in "Friedel-Crafts and Related Reactions II, Part 1", 116–404, ed. by George A. Olah, Interscience Publishers (1964) can be used. Among them, tin chloride, boron trifluoride etherate, zinc chloride, aluminum chloride and a mixture thereof are preferred.

Examples of substantially inert solvents are benzene, toluene, chlorobenzene, o-dichlorobenzene, o-chlorotoluene, p-chlorotoluene, nitrobenzene, carbon disulfide and the like, preferably chlorobenzene, o-dichlorobenzene.

The molar ratio of chloromethylstyrene (b) to p-alkylphenol (a)(i.e. b/a) is 0.70–1.20, preferably 0.85–1.05. When the ratio, b/a is less than 0.70, the resulting antioxidant has a low molecular weight, while when it is more than 1.20, there exist several defects, for example, the process is uneconomical and the product is ready to be gelled in the reaction steps.

When molar ratio of p-alkylphenol to chloromethylstyrene (a/b) is not more than 1, a vinyl compound such as styrene, isobutylene or di-isobutylene, halide such as t-butyl chloride or benzyl chloride can be used as a blocking agent for a terminal residue.

The reaction of p-alkyl phenol (a) and chloromethylstyrene (b) is preferably carried out via two steps in a substantially inert solvent at the concentration (a+b) of 20–80% by weight, especially 40–60 % by weight. That is, chloromethylstyrene (b) is added dropwise to p-alkyl phenol (a) in the presence of Friedel-Crafts catalyst at the temperature below 35° C., preferably in the range of 0°–20° C. to carry out addition reaction. Then, optionally different kind of Friedel-Crafts catalyst is further added thereto and subjected to dehydrochlorination at 40°–90° C., preferably at 50°–75° C. to remove generated gaseous hydrogen chloride.

The amount of Friedel-Crafts catalyst used varies depending upon a kind of the catalyst and water contained in a starting material and a solvent. However, it is generally 0.1–5 parts based on 100 parts of p-alkyl phenol.

Said dropwise addition and the dehydrochlorination are carried out, respectively, over 3–7 hours and 6–16 hours.

After the reaction is completed, the reaction solution is washed with water, optionally treated with an aqueous alkaline solution, and can be used after solidification or directly in the form of solution depending on the purpose. Further, when the terminal group of the antioxidant molecule consists of chloromethyl, a chloro group thereon may be substituted by a thio or imino group, or may be left in situ as reactive group.

The antioxidant of the present invention imparts an excellent resistance against heat- or light-aging to a synthetic fiber and a resin. The present invention also provides a process for production of the antioxidant suitable for said purpose, which has number average molecular weight of 1,000–8,000, especially of 2,000–5,000. When the number average molecular weight of the antioxidant is less than 1,000, it can not induce desired effects. On the other hand, when the number average molecular weight is more than 8,000, it induces a long reaction time of p-cresol with p- and/or m-chloromethylstyrene, insolubilizing of the product and high viscosity of solution of the product which gives difficulty to washing process.

The invention is illustrated by the following examples which are not limitative of the scope of the invention.

The term "parts" used herein means parts by weight unless otherwise indicated.

EXAMPLE

Example 1

To CMS-P® (produced by Seimi Chemical KK, chloromethylstyrene, purity of 96%, consisting of about 40% of para-isomer and about 60% of metha-isomer) was added 200 ppm of 2,6-t-butyl-4-methyl phenol, and the resulting mixture was successively washed with 3% and 0.5% aqueous mixture of sodium hydroxide and sodium hydrosulfite, and water to remove colored polymerization inhibitor, and then dehydrated by passing through a column containing molecular sieves 3A.

Into a glass reactor equipped with a stirrer, nitrogen gas inlet and a discharge orifice and a dropping funnel were placed 90 parts of p-cresol, 90 parts of chlorobenzene and 0.4 parts of 47% boron trifluoride etherate. The mixture of 140 parts of the above chloromethylstyrene, 10 parts of p-cresol and 150 parts of chlorobenzene was added dropwise over 3 hours with stirring. The resulting mixture was reacted at 30°–35° C. for 10 hours, while the IR absorbance of vinyl C—H out-of-plane bending at 990 cm$^{-1}$ is missing.

Then, nitrogen gas was introduced into the reactor while waste gas was drawn into an aqueous solution of sodium hydroxide. 0.1 Parts of zinc chloride was added and the temperature was raised to 70°–80° C. The reaction was carried out at the said temperature for 7 hours, while hydrogen chloride gas was generated and substantially stopped. The solution of reacting product was washed with water and aqueous sodium hydroxide. After removing most of chlorobenzene under a reduced pressure in a rotary evaporator, the viscous residue was washed with methanol (500 parts×4).

The residue was dried under reduced pressure to give a white solid. Melting point of the product measured at the rate of 10° C./min. was 141°–153° C., and yield was 98%.

The product was analyzed by IR and $^{13}$C-NMR spectroscopy.

FIG. 1 shows IR spectrum. The peak at about 3550 cm$^{-1}$ indicates the existance of hydroxyl group of hindered phenol.

NMR measured by Varian FT-80A (NMR spectrometer produced by Varian Associates Inc.) in deutration chloroform solution with tetramethylsilane as a standard at room temperature shows the chemical shift (ppm) as follows:

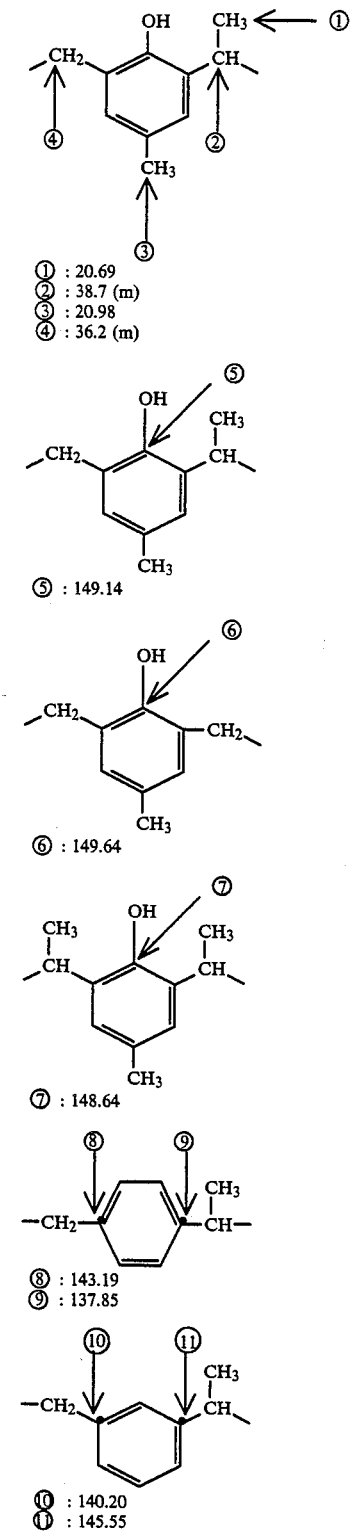

Integrated intensity (①+③) substantially equals to that of (②+④). And with regards to the main chain, the ratio of the integrated intensity ⑤:⑥:⑦ is about 1.0:0.8:1.1. Chemical shifts of methylene and ethylidene groups next to ⑧, ⑨ or ⑩, ⑪ are, respectively, corresponding to ④, ① and ②.

Therefore, the resulting polymeric compound includes a structure of the following formulae [A], [B] and [C] with respect to a phenol residue depending on the arrangement of monomeric units thereof, and the molar ratio of [A], [B] and [C] is about 1.0:0.8:1.1.

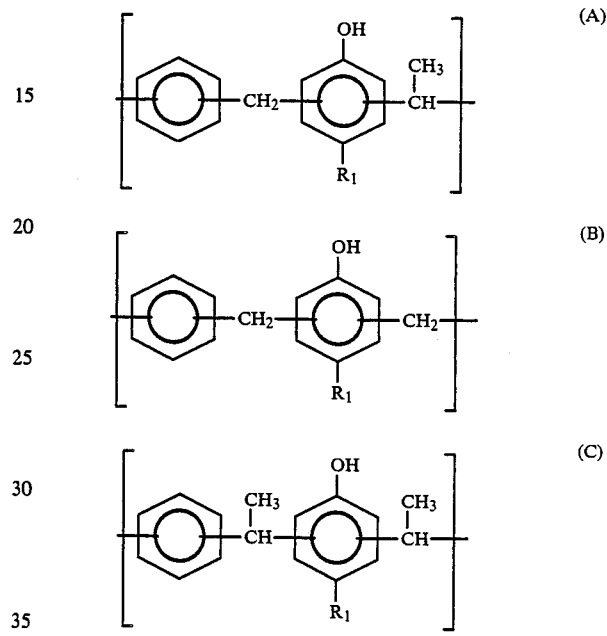

And methylene group is deficient because there exists the terminal group as follows:

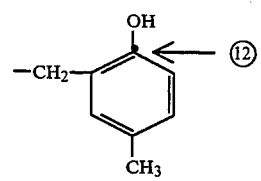

⑫ : 150.83 (ppm)

The novel polymeric antioxidant of the present invention is found to have hydroxyl group with respect to the IR absorption at about 3,550 cm$^{-1}$. Also, the antioxidant is found to have the repeating units of the formulae [A], [B] and [C] according to $^{13}$C-NMR spectroscopy.

Molecular weight defined by using toluene as a solvent in Hitachi-Perkin-Elmer 115 Molecular Weight Apparatus (vapor pressure osmometer manufactured by The Perkin-Elmer Corp.) according to the method described in Journal of Physical and Colloid Chemistry, 55, 304 (1951), was 4,500.

Example 2

The process of Example 1 was repeated, except that CMS-14 ® (p-chloromethylstyrene of purity of 95%, produced by Seimi Chemical Co., Ltd.) was substituted for CMS-P ®.

The product was obtained as a pale yellow solid having a melting point of 121°-138° C. The product has a molecular weight of 4,500.

Example 3 p-Cresol (100 parts), zinc chloride (0.2 parts) and chlorobenzene (100 parts) were placed in the same eactor as described in Example 1, and to which a mixture of chloromethylstyrene (118 parts) and chlorobenzene (118 parts), purified in Example 1, was added dropwise at 35°-45° C. over 5 hours. The mixture was further reacted at the temperature for 10 hours. In IR spectrum, there was no peak found at 990 cm$^{-1}$. Then, the mixture was heated to 70°-80° C. and reacted for 7 hours in the same manner as Example 1, and the product was obtained as a white solid having a melting point of 127°-134° C. Yield, 97%; Molecular weight, 1,500.

Example 4 p-Cresol (80 parts), chlorobenzene (80 parts) and 47% boron trifluoride etherate (1 part) were charged in the same reactor as described in Example 1. The mixture of chloromethylstyrene (144 parts), p-cresol (20 parts) and chlorobenzene (164 parts), purified in Example 1, was added dropwise at 28°-30° C. with stirring over 5 hours. The resulting mixture was further reacted at the same temperature for 7 hours. Then, in IR spectrum of the reaction mixture, a peak at 990 cm$^{-1}$ disappeared. The mixture was heated to 70°-80° C. and reacted for 7 hours in the same manner as described in Example 1 to give a viscous solution. The solution, diluted by addition of 200 parts of chlorobenzene, was washed with water and an aqueous alkaline solution. After 300 parts of chlorobenzene was distilled off in a rotary evaporator, the product was precipitated by addition of methanol, washed and dried in the same manner as described in Example 1. The product was obtained as a white solid having a melting point of 145°-160° C. Yield, 97%; Molecular weight, 7,500.

Example 5 p-Cresol (674 parts), chlorobenzene (974 parts) and anhydrous tin chloride (20 parts) were charged in the same reactor as Example 1. The mixture of CMS-P® (produced by Seimi Chemical KK; purity, 96%; a mixture of about 60% of m-isomer and about 40% of p-isomer)(1,128 parts), styrene (156 parts), p-cresol (168 parts) and chlorobenzene (1,116 parts) was added dropwise under cooling at about 5° C. for 6 hours. The reaction mixture showed no peaks at 990 cm$^{-1}$ in IR spectrum. The mixture was heated to 45°-50° C., and gaseous hydrogen chloride was removed for 8 hours. The reaction mixture was washed sequentially with water (three times), aqueous solution of soda ash (35 parts) (once), and water (five times) at 60° C.

After 760 parts of chlorobenzene was distilled off at 60° C., 100 mmHg, 2,340 parts of dimethylacetamide was added to the residue, and 2,000 parts of the solvent was distilled off at 90-15 mmHg. The residue was adjusted to solid content of 50% and 3,580 parts of pale yellow solution having a viscosity at 30° C. of 20 poise was obtained.

Reference Example 1

In order to obtain an antioxidant for reference, a resin-type polycondensation product from p-cresol and divinylbenzene was synthesized according to the method described in Example 1 in Japanese Patent Publication No. 6510/1972.

Into a reactor equipped with a stirrer, dropping funnel, nitrogen gas inlet, condenser and thermometer were placed 237 parts of p-cresol and 400 parts of toluene. Into the dropping funnel was placed a mixture of 315 parts of divinylbenzene (purity of 98%, ratio of para-isomer/methaisomer=30/70), 26 parts of p-cresol and 300 parts of toluene. The above mixture (about 18 parts) was added into the reactor with stirring. Then, boron trifluoride diethyl etherate (6 parts) was added into the reaction mixture through the condenser. The remainder of the mixture in the dropping funnel was added dropwise over 2 hours. The reactor was cooled, and the reaction was further continued for 16 hours below 30° C.

The resulting resin-type polycondensation product has a number average molecular weight was about 2,500, which was defined by using Showdex A-803 and calculated in terms of polystyrene in the same manner as Example 1.

Example 6

Polytetramethylene ether glycol having molecular weight of 1,950 (1,950 parts) and 4,4'-diphenylmethanediisocyanate (500 parts) were reacted at 70° C. for 90 minutes to give a prepolymer having isocyanate groups at its ends. After cooled to room temperature, dry dimethylformamide (4,478 parts) was added to give a solution of the prepolymer.

In another run, 1,2-propylene diamine (74 parts) and diethylamine (9.5 parts) were dissolved in dry dimethylformamide (983 parts), to which was added the said prepolymer solution at room temperature to give a solution of polyurethane having viscosity of 2,400 poise at 30° C.

46% Paste of titanium oxide pigment containing a small amount of blue pigment dispersed in dimethylformamide (145 parts) and 32% solution of poly(N,N-diethyl-β-aminoethyl methacrylate) in dimethylformamide (117 parts) was added and mixed into the said solution of polyurethane.

To the above solution were added 1 part of antioxidant obtained in Examples 1-5 based on 100 parts of polyurethane (as a slid), and the resulting mixture was stirred, and subjected to dry-spinning according to a conventional method to give elastic fiber of 40 denier/5 filaments. The product was irradiated in a fade-o-meter at 0° C. for 40 hours and retention of breaking strength of the elastic fiber was defined, which is shown in Table 1.

For comparison, the data of elastic fiber obtained by adding the resin-type polycondensation product from divinylbenzene and p-cresol (a compound of Reference Example (1 part) to polyurethane (100 parts), or elastic fiber without any additives (Reference Example 2), are also shown in Table 1.

TABLE 1

| | Antioxidant | Breaking Strength of Elastic Fiber (Retention %) |
|---|---|---|
| The Present Invention | Compound of Ex. | |
| | 1 | 90 |
| | 2 | 90 |
| | 3 | 85 |
| | 4 | 90 |
| | 5 | 95 |
| Reference | Resin-type Poly- | 55 |

TABLE 1-continued

| | Antioxidant | Breaking Strength of Elastic Fiber (Retention %) |
|---|---|---|
| Example 1 | condensation Product from Divinylbenzene and p-Cresol | |
| Reference Example 2 | — | 5 |

As is obvious from Table 1 showing the case of polyurethane fiber, the antioxidant of the present invention has more excellent resistance against light and dry-cleaning compared with those of Reference Examples.

Advantage of the Invention

The polymeric antioxidant of the present invention prevents decrease of antioxidant effect due to scattering of the agent during the processing process, and removing of the antioxidant upon processing or usage, which has been regarded as defects of the prior art. Further, the polymeric antioxidant of the present invention is white or nearly white, and hardly colored, therefore coloring of the product upon processing and using can be prevented.

Moreover, according to the process of the present invention, purification of the starting material is readily carried out, therefore the desired antioxidant can be easily produced.

The polymeric antioxidant of the present invention is generally effective for polymeric compound such as polyesters, polyamides, polyurethanes, or the like, particularly effective for production of a polyurethane fiber.

What is claimed is:

1. A polymeric antioxidant which comprises a repeating monomeric unit having the formula (I):

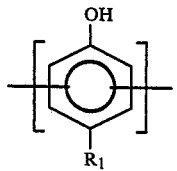
(I)

wherein $R_1$ is methyl or ethyl; and a repeating monomeric unit having the formula (II):

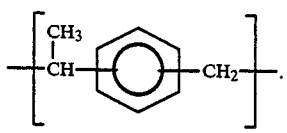
(II)

2. A polymeric antioxidant according to claim 1, wherein the antioxidant has a number average molecular weight of 1,000 to 8,000.

3. A polymeric antioxidant according to claim 1, wherein monomeric units having formulae (II) and (I) have a molar ratio, (II)/(I), ranging from 0.70/1 to 1.20/1.

4. A polymeric antioxidant according to claim 1, wherein the monomeric units having formulae (II) and (I) have a molar ratio, (II)/(I), ranging from 0.85/1 to 1.05/1.

5. A process for production of a polymeric antioxidant which comprises reacting p-alkyl phenol monomer having a formula (III):

(III)

wherein $R_1$ is methyl or ethyl; with a monomer having a formula (IV):

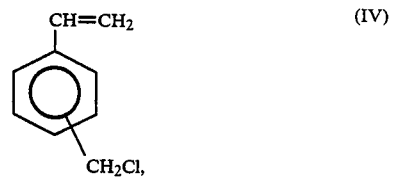
(IV)

in a substantially inert solvent in the presence of a Friedel-Crafts catalyst.

6. A process according to claim 5, wherein a monomer having a formula (IV) is a monomer selected from the group consisting of p-chloromethylstyrene, m-chloromethylstyrene, and a mixture of p- and m-chloromethylstyrene.

7. A process according to claim 5, wherein a molar ratio of a monomer having a formula (IV)/p-alkyl phenol monomer having a formula (III) is in the range of 0.70/1 to 1.20/1.

8. A process according to claim 5, wherein a molar ratio of a monomer having a formula (IV)/p-alkyl phenol monomer having a formula (III) is in the range of 0.85/1 to 1.05/1.

9. A process according to claim 5, wherein the solvent is chlorobenzene.

10. A process according to claim 5, wherein the catalyst is stannic chloride.

11. A process according to claim 5, wherein the reaction of p-alkyl phenol with the monomer of the formula (IV) is carried out at a temperature of below 35° C. followed by removing hydrogen chloride at a higher temperature.

* * * * *